T. DARK.
Receiver and Stench-Traps for Street-Sewers.

No. 197,255. Patented Nov. 20, 1877.

Witnesses:
J. R. Drake.
T. H. Parsons.

Thomas Dark
Inventor,
By J. R. Drake,
Atty

UNITED STATES PATENT OFFICE.

THOMAS DARK, OF BUFFALO, NEW YORK.

IMPROVEMENT IN RECEIVERS AND STENCH-TRAPS FOR STREET-SEWERS.

Specification forming part of Letters Patent No. 197,255, dated November 20, 1877; application filed February 12, 1877.

*To all whom it may concern:*

Be it known that I, THOMAS DARK, of Buffalo, in the county of Erie and State of New York, have made certain Improvements in Street-Receivers and Stench-Traps, of which the following is a specification:

This invention in an improvement on my Patents Nos. 114,220 and 185,017; and consists in its construction as hereinafter specified.

Figure 1:
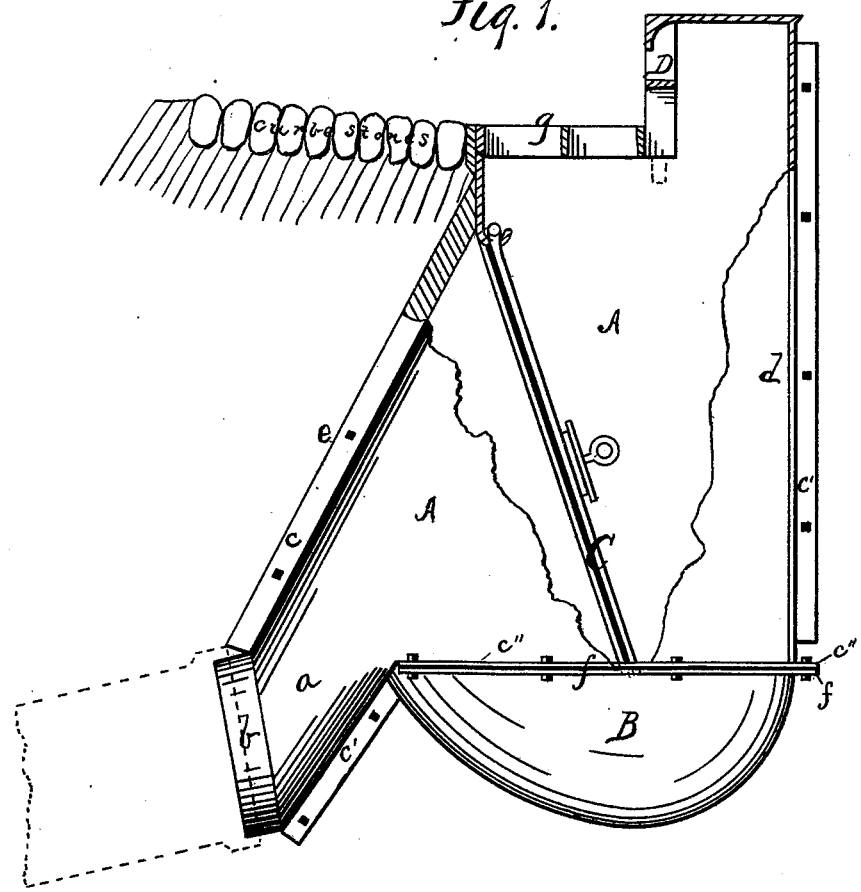
Figure 2:
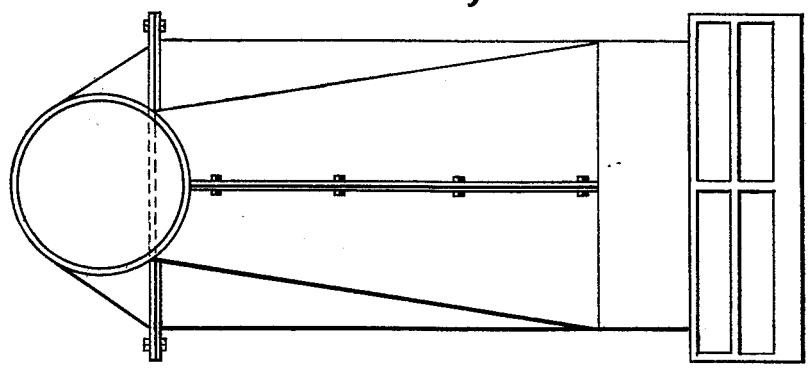

In the drawings, Figure 1 is a side elevation of one-half the receiver, showing its position in the street and its connection with the sewer. Fig. 2 is a front plan, showing the connecting-flanges, the grating at the top, and the lower openings from the trap into the sewer.

A A represent the body of the receiver, made in two parts, of metal, with the slanting opening $a$ and pipe-mouth $b$, or outlet to the trap. These two parts are fastened together by the flanges $c$ $c'$, front and back, and bolted or otherwise secured together.

The back $d$ is made straight, instead of slanting, as in my previous patent, and the front $e$ made slanting, as shown. This gives a greater and sufficient fall and force to the water rushing into the receiver to "flush" the trap B, and is an important improvement. This trap or bowl is constructed in one piece, of metal, and attached to the upper parts A A by a flange, $f$, running around the sides and back, and bolted to the flange $c''$ of the receiver. It is smaller than in my other patents, and is thus made so as not to expose the water in the trap so much to frost—also an important improvement.

This construction makes the bowl, the sides, and the sloping front $a$ and pipe-mouth $b$, all constructed of three pieces only, of casting—a great saving in material, besides making a better construction every way. One of its chief advantages is in the slope of the front $e$ $a$, as it gives a better capacity and better opportunity to clean the receiver, if obstructed, and also makes it much less exposed to the frost. The sides have the usual frost-flange.

C is the slanting door, which is constructed, arranged, and fastened as described in my other patents, except that it is larger. D is the grating in connection with the curb of the sidewalk, and $g$ the grating covering the opening to the receiver.

I claim—

The metal receiver made of the two parts A A $a$ $b$, with the slanting front $e$ and straight back $d$, and connected together by the flanges $c$ $c'$, and in combination with the bowl or trap B, substantially as hereinbefore specified.

In witness whereof I have hereunto signed my name in the presence of two subscribing witnesses.

THOMAS DARK.

Witnesses:
J. R. DRAKE,
T. H. PARSONS.